Jan. 30, 1968  J. R. KENNEY  3,366,860
POSITION CONTROL APPARATUS
Filed April 19, 1965  5 Sheets-Sheet 4

United States Patent Office 3,366,860
Patented Jan. 30, 1968

3,366,860
POSITION CONTROL APPARATUS
John R. Kenney, Ottawa, Ontario, Canada, assignor to Canadian Patents and Development Limited, Ottawa, Ontario, Canada, a company of Canada
Filed Apr. 19, 1965, Ser. No. 449,187
8 Claims. (Cl. 318—30)

This invention relates to an apparatus and method for automatically controlling the position of a motor driven element along a predetermined path, and more particularly, but not exclusively, to an apparatus and method for automatically controlling the position of an antenna in order to track a body moving through space such as a satellite traveling in a known orbit, for example, a weather satellite.

A known method for controlling the position of an antenna in order to track a satellite requires an operator to position the antenna, at predetermined time intervals, in both the azimuth and elevation planes and at the same time refer to a signal strength monitor. This is a disadvantage.

From one aspect it is an object of the present invention to provide apparatus for cointrolling the movement of a motor-driven element in which the manual operations necessary to control the movement of the motor-driven element, for example an antenna, are reduced.

From one broad aspect it is an object to provide position control apparatus for controlling an element to move in a predetermined manner comprising a disc having a plurality of pin-receiving holes therein, a plurality of pins for insertion in said holes in a pattern determined in accordance with said predetermined manner, sensing means for sensing the position of the pins in succession, and control means responsive to said sensing means to cause movement of said element in accordance with the position of the sensed pins.

From another aspect it is in an object of the present invention to provide a method of controlling the movement of a motor-driven element in which the manual operations necessary to control the movement of the motor-driven element, for example an antenna, are reduced.

From another broad aspect it is an object to provide a method of controlling an element to move in a predetermined manner comprising the steps of storing control information by inserting pins in holes in a disc and periodically sensing the position of said pins and controlling relative movement of said element in accordance with said sensing.

One embodiment of the invention as applied to programming apparatus for controlling the movement of an antenna to follow the movement of a satellite through space will now be described, by way of example, with reference to the accompanying drawings in which.

The illustrated programming apparatus comprises an azimuth programmer unit, an elevation programmer unit, and a timer programmer unit. The azimuth programmer unit and the elevation programmer unit each include an annular disc with pin receiving holes therein. Pins are insertable in said holes in a pattern in accordance with the movement of the satellite. An azimuth arm and an elevation arm associated with the respective disc is capable of sensing the position of the pins in succession and electrical output signals are produced to produce a change in the respective bearing of the antenna to point it in direction determined by the next predicted position of the satellite. The time programmer unit controls part of the operation of the azimuth and elevation programmer and for convenience will be described in detail first.

Figure 1:
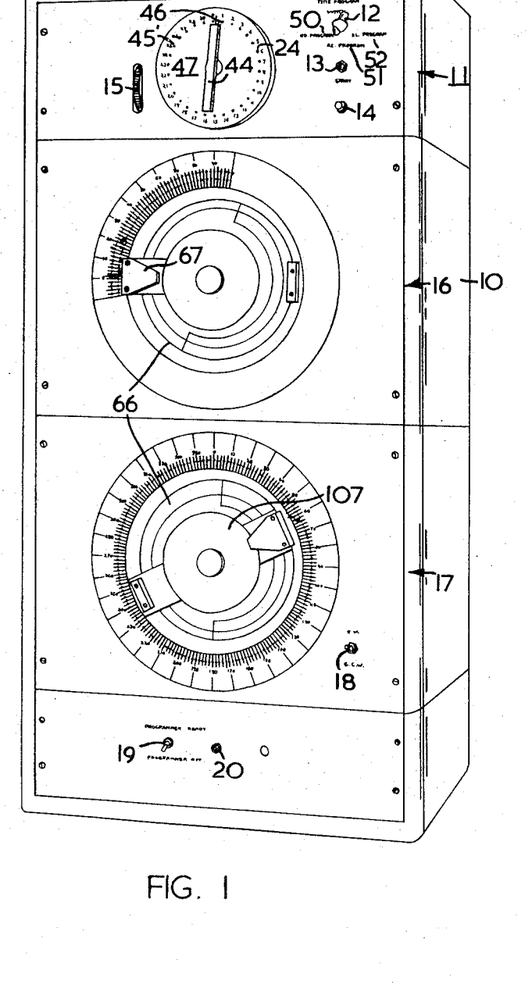
FIGURE 1 is a front view of part of the programming apparatus showing the azimuth, elevation and the time control discs and associated photo-discs.

Referring to FIGURES 1, the programming apparatus is contained in a cabinet 10. On the upper portion of the front panel of the cabinet 10 there is mounted a time programmer unit 11, a selector switch 12 associated therewith and a reset adjustment 15 for manually operating the movable arm 44 of the time programmer unit. Also mounted on the upper portion of the front panel is a start switch 13 to initiate the operation of the time programmer unit, and an indicating lamp 14 providing visual indication when the time control is in operation.

An elevation programmer unit 16 and an azimuth programmer unit 17 are mounted below the time programmer unit 11. A reversing switch 18 is associated with the azimuth programmer unit 17 and controls the direction of rotation of the azimuth programmer unit. A switch 19 is also provided below the azimuth programmer unit to connect power to the apparatus. A lamp 20 indicates if the power is switched on.

The time programmer unit 11 includes an electric clock with a single movable arm 44 mounted at the centre of a time control disc 47 and capable of making one complete revolution in thirty minutes. Along the periphery of the disc 47 holes 45 are drilled at a spacing corresponding to one minute of movement of the arm 44. At one extremity of the arm 44 a wiper 46 is mounted thereon and protrudes sufficiently to make contact with ³⁄₃₂" diameter steel pins 24 which may be placed in one or more of the holes drilled in the periphery of the disc. At every minute interval an advance pulse is provided by the time programmer unit 11 to initiate operation of the azimuth and elevation programmer units. If a pulse is to be suppressed at a certain time in the programming, a pin 24 is inserted in the hole associated with the respective minute where the suppression of the pulse is required.

A hole in the time control disc is also provided at +½ minute position so that the first advance pulse is provided ½ minute after the time programmer unit starts.

The pins 24 may be used to control the operation of either the azimuth or elevation programmer units by means of a selector switch 12 having three positions; no program position 50, azimuth program position 51, and elevation program position 52. When the switch 12 is at the no program position 50, a pulse is initiated every minute and any pins encountered in the path of travel by arm 44 will not cause suppression of the respective timing pulse. When the switch is in the azimuth program position 51 or the elevation program position 52 and the wiper 46 encounters a pin in its path, the next advance pulse will automatically be suppressed and will not be passed on to either the azimuth or elevation programmer, depending on the position of the selector switch.

Figure 2:
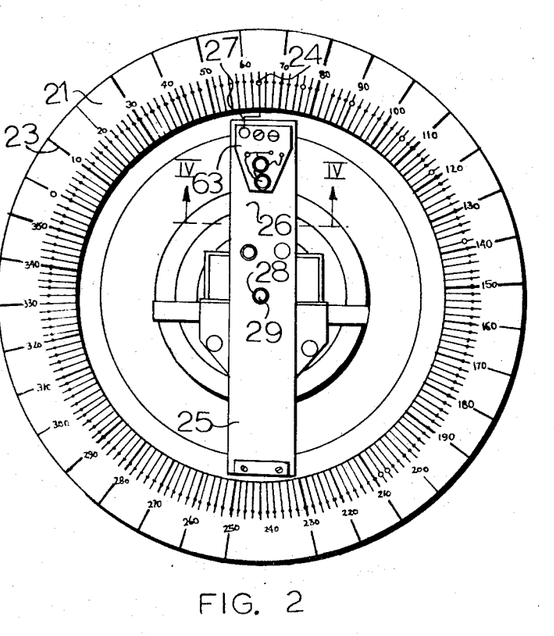
FIGURE 2 is a front view of the azimuth control disc with the transparent photo-disc removed and the associated photodiode cover removed for illustration purposes.

Referring now to FIGURE 2, the azimuth programmer unit 17 comprises an annular Bakelite disc 21 having an inside diameter of nine inches and a thickness of ½ inch. The Bakelite disc 21 is equipped with a 2° gradation scale 23, from 0° to 360°, around its inner periphery and holes 22 are drilled at every division of the scale. The holes 22 are of such size that $3/32''$ diameter steel pins 24 can be easily inserted and removed. If larger discs and smaller pins ($1/16''$ diameter) are provided then, of course, the holes 22 may be drilled every degree.

At the centre of the Bakelite disc 21 an arm 25 is mounted and this extends along a diameter of the Bakelite disc almost to its inner periphery. The arm 25 may be driven by a small motor through a slipping clutch (not shown) mounted on the motor shaft 28. Extending through the centre of the shaft 28 is another shaft 29 which is capable of being driven by a synchro-receiver of an antenna follower system which will be described later. Mounted on the arm 25 is an electromagnet (not shown) that operates a spring-loaded push-rod 26 which extends beyond the arm 25 sufficiently to engage with the pins 24 positioned in the holes 22 in the inner periphery of the disc 21. When the electromagnet is not energized the engaging portion 27 of the push-rod extends just far enough to engage an inserted steel pin 24 and thereby stops the arm 25 from moving past that position.

Figure 3:
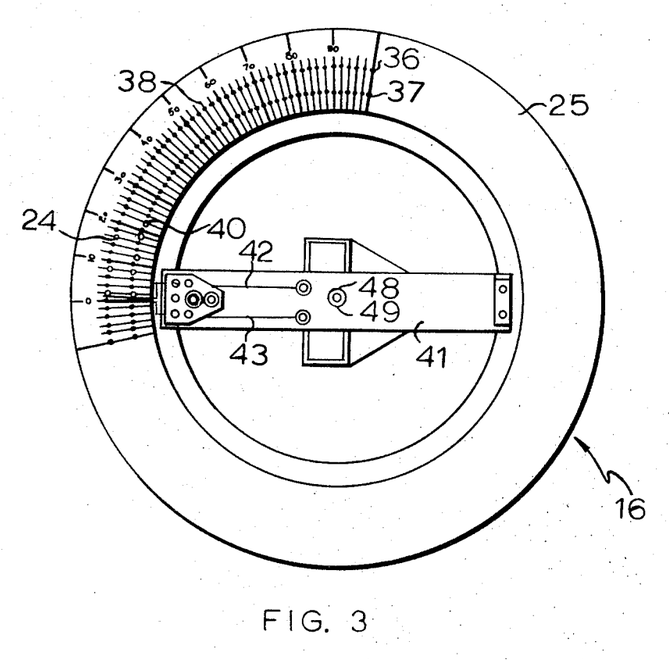
FIGURE 3 is a front view of the elevation control disc with the photo-disc removed and the associated photodiode cover removed for illustration purposes.

Referring to FIGURE 3 the elevation programmer unit 16 like the azimuth programmer unit 17 includes an annular Bakelite disc 35 having an inside diameter of nine inches and a thickness of ½ inch. Approximately one-quarter of the periphery of the Bakelite disc has a scale 38 thereon with a 2° interval gradation between 0° and 90°. This scale is provided to indicate the position of the antenna as it moves up and then down during a pass. As will be appreciated the maximum elevation ever required being 90°.

At the centre of the Bakelite disc 35 is mounted an arm 41 which is driven by a small motor through a slipping clutch (not shown) mounted on the motor shaft 48. Extending through shaft 48 is a shaft 49 which is driven by a synchro-receiver of the antenna following system. On the arm 41 are mounted two spring-loaded push-rods 42 and 43 each operated by a respective electromagnet (not shown). These electromagnets are mounted on the opposite face of the arm 41 to the push-rods 42 and 43.

To program the upward and downward movement of the antenna a double arc of holes 36 and 37 are drilled in the Bakelite disc 35. One hole from each row is provided for each division of the scale. By drilling the inner arc of holes 37 deeper than the outer arc of holes 36, one push-rod 43 can be arranged to engage pins located in the inner arc, and the other to engage pins in the outer arc without interference even though pins of the same length are used. Push-rod 43 is of such a length as to engage only the inner arc of holes 37 and is used to program the upward motion of the antenna. Push-rod 42 is of a sufficient length to engage the outer arc of holes 36 and is utilized for programming the downward motion of the antenna. A special pin 40 having a larger diameter than the steel pins 24 is positioned in inner arc 37 at the extremity of the program path and is used to cause the reversal of the drive of the motor driven arm 41, when the antenna has reached its maximum elevation. With the drive reversed the arm resumes its programming on the outer arc of holes 36. When the arm 41 reaches the extremity of the program path in the inner arc 37 the special pin 40 closes two contacts mounted on the arm, and these in turn, through a self-holding relay, reverse the motor driving the arm 41.

Referring to FIGURE 1, under the photo-diode covers 67 at the extremity of the arms of both the azimuth and elevation programmer units there is provided an azimuth and an elevation antenna follower system respectively. Since both of these systems are identical, the follower system for the azimuth programmer unit only will be described but, it will be appreciated that the description is equally applicable to the elevation programmer unit.

Figure 4:
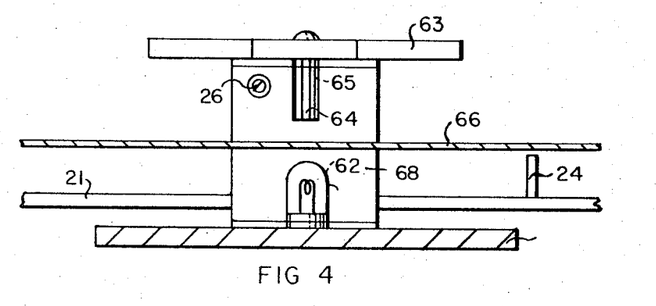
FIGURE 4 is an enlarged sectional view taken on the line IV—IV of FIGURE 2, but with the photo-disc in position.

FIGURE 4 shows the azimuth follower system in detail and it will be seen that on the arm 25 of the azimuth programmer there are mounted two electric light bulbs 61 and 62. Adjacent these are mounted two photo-diodes 64 and 65 each of which is associated with a different light bulb. Photo-diodes 64 and 65 are mounted on a member 63 which is connected to the arm 25 via a supporting member 68. Member 63 is positioned substantially parallel to arm 25 in order that the longitudinal axis of diode 64 and light 61, and diode 65 and light 62, are opposite each other. A photo-disc 66, which will be described later, is disposed vertically and is positioned between each photocell and the associated light bulb so as to be capable of interrupting light passing from the light bulbs to the respective photo-diode.

Figure 5:
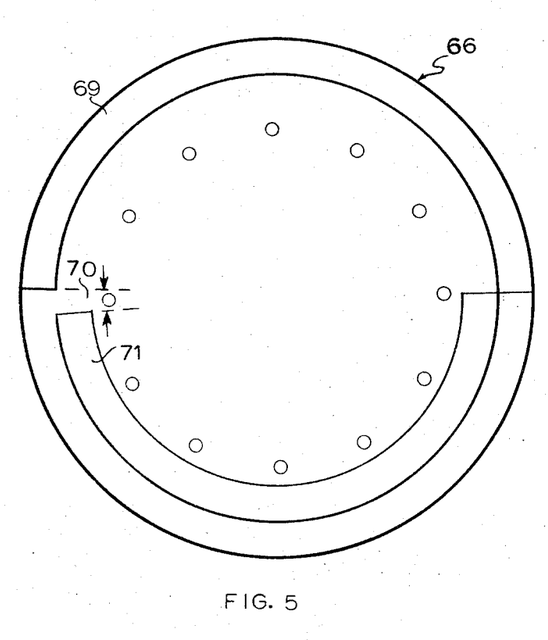
FIGURE 5 is a front view of one of the transparent photo-discs.

As shown in FIGURE 5 each photo-disc 66 comprises a circular sheet of transparent stock such as film. An opaque pattern is formed on the film stock so as to leave a transparent wedge 69 extending around the periphery a distance approximately half the circumference of the disc. Another transparent wedge 71 is provided around the other half of the circumference but having an external radius equal to the internal radius of the transparent wedge 69. Between the two wedges 69 and 71 at one end, a gap 70 is provided, as shown. The width of the gap 70 is determined by the diameter of the photo-diode and the coasting angle of the antenna.

Figure 6:
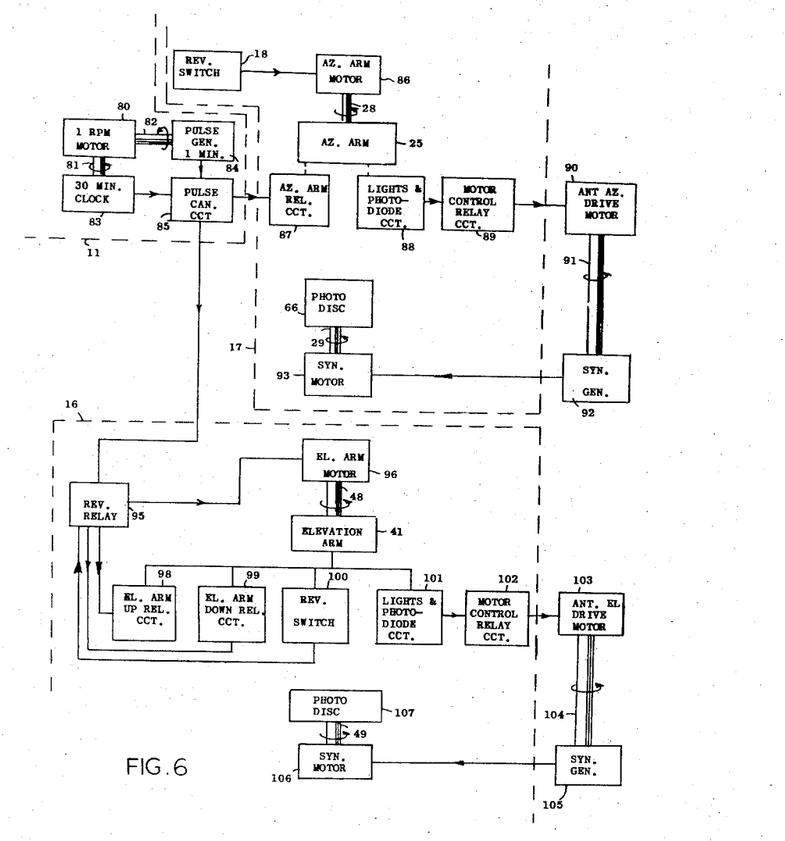
FIGURE 6 is a block diagram of the electrical circuits associated with the control discs and associated photo-discs of FIGURE 1.

The block diagram of FIGURE 6 illustrates the way in which the various units which make up the elevation programmer unit 16, the azimuth programmer unit 17 and the time programmer unit 11 are interconnected when in operation.

The azimuth arm 25 of the azimuth programmer unit 16 is driven by an azimuth arm motor 86, which is provided with a reversing switch 18, by way of a drive shaft 28. As explained above, an electromagnet is provided to withdraw push-rod 26 so that the azimuth arm 25 can move to the next pin position. This is controlled by the azimuth arm release circuit 87 whilst the photo diodes and associated light bulbs are connected in a lights and photo-diode circuit 88 which supplies a control output to a motor control relay circuit 89 whose output is fed to the antenna azimuth drive motor 90. By means of shaft 91 which is a part of the motor shaft, although it may, if desired, be a separate shaft connected to the motor shaft, a synchro-generator 92 is driven to follow the antenna. The synchro-generator is electrically connected to supply an output to control a synchro-motor 93 and the photo-disc 66 is mounted on shaft 29 of synchro-motor 93 and is turned by it. Thus generator 92 and motor 93 form a servo system which is operative to cause the photo-disc 66 to rotate in synchronism with the azimuth rotation of the antenna which is itself caused to rotate in synchronism with the azimuth arm 25. The system is, in effect, a feed back system because as soon as azimuth arm 25 moves ahead a signal is generated via the circuit 88 to operate the antenna azimuth drive motor 90. As soon as this operates to turn the antenna, a signal is fed back to photo-disc 66 associated with azimuth arm 25 to rotate the photo-disc 66 in such a direction that opaque wedge 70 (FIGURE 5) moves to intercept light passing from light bulb 61 or 62 to the respective photo-diode.

A similar circuit arrangement is provided for controlling the antenna elevation drive motor. The elevation arm 41 is driven, through shaft 48, by an elevation arm motor 96 which is provided with a reversing relay 95. As explained earlier two sets of pins are provided for the elevation disc 35, one set 37 (FIGURE 3) for the positioning of the antenna to follow the upward portion of the satellite's trajectory and another set 36 for the downward portion of the satellite's trajectory. Therefore in FIGURE 6 two elevation arm release circuits 98 and 99 are provided for energization of the respective electromagnets for retracting the push-rods 42 and 43.

A reversing switch 100 is provided and is operable when the elevation arm 41 has reached the special pin 40 (FIGURE 3) at the extremity of the upward portion of the satellite's trajectory.

Lights and photo-diode circuits 101 and motor control relay circuits 102 are provided for control of the antenna elevation drive motor 103 similar to those for the antenna azimuth drive motor 90. The shaft 104 of a synchro-generator 105 is driven by the antenna elevation drive motor 103 and therefore a signal is provided to a synchro motor 106 on whose shaft, or an extension thereof, is mounted the photo-disc 107. In this way a feed back system is provided for the elevation arm 41 which is similar to that provided for the azimuth arm 25.

In the time programmer unit 11 a 1 r.p.m. motor 80 is provided with two drive shafts 81 and 82, one of which 81 is used to drive the electric clock which is designated as 83 in FIGURE 6. As explained earlier it is designed to make one complete revolution in thirty minutes, which is normally the maximum time a satellite is above the horizon at any particular tracking station. The other drive shaft 82 of motor 80 drives a pulse generator 84 which provides one pulse per minute, via a pulse cancel circuit 85 which is normally inoperative, to the azimuth arm release circuit 87 to operate the associated electromagnet and momentarily retract the push-rod 26 so that the azimuth arm 25 (FIGURE 2) can advance to the next pin position. When pulse cancel circuit 85 is inoperative, pulses at one minute intervals are also supplied through the reversing relay 95 to either the elevation arm upward release circuit 98 or the downward release circuit 99 to energize the respective electromagnet and either push-rod 43 or push-rod 42 dependent on whether movement of the elevation arm 41 is controlling the antenna to follow the upward or downward portion of the satellite's trajectory.

The operation of the programming apparatus will now be described. To set up the programmer apparatus so that an antenna will follow the movement of a satellite through space it is necessary to know the predicted azimuth and elevation bearing of the satellite at one minute intervals. For satellite stations this information may be computed at a computer centre, and relayed by teletype to the programming apparatus station concerned. Pins are inserted in the holes in the azimuth disc at positions corresponding to the predicted azimuth bearings of the satellite. Similarly the predicted elevation angles which the antenna should adopt to be pointed at the satellite are programmed by inserting pins in the holes of the disc of the elevation programmer unit. For the elevation programmer disc the pins in the inner arc of holes will determine the direction in which the antenna will point to follow the upward part of the trajectory of the satellite whilst those in the outer arc will determine the direction in which the antenna will point to follow the downward part of the satellite's trajectory. As explained earlier a special pin having a larger diameter is inserted in a hole in the inner arc after the pin representing maximum elevation. As the arm 41 rotates, part of it abuts against this special pin to close a pair of contacts provided on the arm 41 and this is effective to cause the direction of the motor driving the arm to be reversed. Should a change in the azimuth or elevation bearing of the antenna not be required for any particular minute a pin is inserted in a hole 45 in the face of the time programmer unit 11 at a position correseponding to that particular minute. The selector switch 12 forming part of the timer unit must, of course, be in the correct position to select the programmer unit arm 25 or 41 which is to remain stationary for that particular minute. Once the required pins are inserted in the selected holes of the azimuth disc, a reversing switch 18 associated therewith is switched to the required direction of movement for the antenna corresponding to either clockwise or counter-clockwise movement of the satellite with respect to the antenna. The switch 18 determines the polarity of the voltage applied to the azimuth arm motor 86 and therefore the direction of drive of the azimuth arm 25.

To initiate operation of the programming apparatus, switch 19 (FIGURE 1) must be in the "programmer ready" position. By depressing start button 13 the 1 r.p.m. motor 80 (FIGURE 6) is switched on and drives the 30 minute clock 83 via a shaft 81. The motor also drives a cam via a shaft 82 which operates a pulse generator 84 to provide pulses at minute intervals. These pulses are utilized to cause movement of the azimuth and elevation arms every minute by momentarily retracting the push-rods 26, 42 or 43. A pulse cancel circuit 85 is connected between the pulse generator 84 and the pin escapement circuit 87 of the azimuth programmer unit 17 and also to the "up" pin escapement circuit 98 and the "down" pin escapement circuit 99 of the elevation programmer. The pulse cancel circuit 85 is controlled by the 30 minute clock 83.

When a pulse is present at the input of the pin escapement circuit 87, the electromagnet associated with the azimuth arm 25 is energized and retracts the respective push-rod so that it disengages from that pin against which it was initially resting. The electromagnet only remains energized for a time equal to the duration of the pulse and therefore the respective push-rod is retracted only for a sufficient time for it to clear the pin that it had been resting against. The arm 25 rotates until the push-rod hits against the next pin. The movement of the azimuth arm 25 is, of course, effected by the azimuth arm motor 86 by way of the drive shaft 28.

As the azimuth arm 25 rotates either the light bulb 61 or 62 mounted thereon, becomes opposite a transparent portion of the respective photo-disc 66 dependent on the direction of rotation of arm 25. Light thus falls on either photo-diode 64 or photo-diode 65 causing the lights and photo-diode circuit 88 (FIGURE 6) to apply a signal to the motor control relay circuit 89 and this activates the antenna azimuth drive motor 90 which in turn drives the antenna so that it turns towards its next azimuth bearing. As the antenna turns, a synchro generator 92 is driven in synchronism with it by a shaft 91 which is, or is connected to, the shaft of the antenna azimuth drive motor. The synchro generator is electrically connected to a synchro motor 93 whose driven shaft 29, as explained earlier with reference to FIGURE 2, is concentric with the drive shaft 28 of the motor of the azimuth arm 25. Since the respective photo disc 66 is mounted on the shaft 29 as the synchro generator emits signals to cause shaft 29 of synchro-motor 93 to turn, so the photo disc 66 is caused to turn in a direction such that the wedge 70 (FIGURE 5) moves to interrupt the passage of light between the light bulb and photo-diode 64 or 65 when the antenna has "followed" the arm 25 to assume a bearing corresponding to the new position of the arm 25.

The pulse transmitted to cause the advance of the azimuth arm 25 is also applied to the "up" pin escapement circuit 98 and the "down" pin escapement circuit 99 of the elevation programmer. When this pulse is applied it causes the retraction of one of the push-rods, 42, 43 on the elevation arm. If the elevation arm 41 is controlling movement of the antenna to follow the upward part of the trajectory of the satellite then the push-rod 43 associated with the inner arc of holes 37 will be retracted. When the downward part of the trajectory is being followed the push-rod 42 associated with the outer arc of holes 36 is retracted. It is to be noted that while one push-rod is engaging a pin the other push-rod remains in its retracted position. The elevation arm 41 (FIGURES 3 and 6) is driven by a motor 96 through a drive shaft 48. When the arm 41 reaches its maximum elevation (the last pin in the inner arc of holes) a reversing switch circuit 101 is engaged and causes the reversing relay circuit 95 to reverse the polarity of the voltage applied to the elevation arm motor 96 and thus causes a reversal of the direction of the elevation arm 41.

As the elevation arm 41 moves between one pin and the next one or other of the light bulbs mounted on arm 41 becomes opposite a transparent portion of the associated photo-disc. Light thus falls on one of the two elevation photo tubes, in a manner similar to that explained earlier in connection with the azimuth arm, the lights and photo-diode circuit 101 is caused to operate the motor control relays 102 which in turn operate the antenna elevation drive motor 103. Motor 103 drives the antenna until it assumes the next elevation bearing correseponding to the new position of the elevation arm 41. Through a shaft 104 the elevation motor 103 also drives a synchro generator 105. The synchro generator is electrically connected to a synchro motor 106 which is thus controlled by the generator to rotate shaft 49 concentric with shaft 48 driving the elevation arm 41. Photo-disc 107 is mounted on shaft 49 and thus turns in such a direction towards opaque wedge of the photo-disc (identical to 70 in FIGURE 5). In this way the photo-disc 107 working in conjunction with the lights and photo-diode circuit 101 control the elevation motor 103 driving the antenna.

It will also be appreciated that interpolation techniques may be incorporated with the apparatus in order to provide a more finite control of the displacement of the antenna. A disc of insulating material may be mounted on the same motor axis as the cam which operates the microswitch for supplying the timing pulses at one minute intervals. The disc of insulating material is provided with equally spaced peripheral brass inserts extending radially into the disc and connected to a common wire. A metallic spring contact engages with the periphery of the insulating disc to complete an electrical circuit every time one of the brass inserts makes contact with it. If for example six equally spaced peripheral brass inserts are provided, the electrical circuit would be completed six times in one minute since the motor speed is 1 r.p.m.

By means of the interpolating technique mentioned in the example above, it is possible to move the antenna in six equal steps corresponding to one movement of the controlling azimuth or elevation arm. For example, if the azimuth arm moved from one pin to the next through an angle of 30 degrees then the entenna would be moved in six equal steps of 5 degrees. With this method it will be appreciated that a more precise tracking is obtained.

An engineering explanation and description will now be set forth in order to elaborate above some aspects of the embodiment of the invention described.

Since the advent of the United States weather satellites with APT (Automatic Picture Transmission) capabilities, many agencies other than regular tracking stations have become interested in satellite tracking. The antennas generally used have a fairly broad beam, 20° to 40° between half power points being typical. If one considers the maximum rate of change of angle of a satellite with respect to the surface of the earth, it is found that positioning of the antenna once a minute is usually adequate. This positioning can be done manually using predicted azimuth and elevation angles versus time. Usually the operator refers to a signal strength monitor as well, and the full attention of the operator is required during the pass. However, for many of the agencies now interested in satellite tracking it is advantageous to keep manpower requirements to a minimum. The antenna programmer is a step in this direction, since it allows the antenna to be programmed beforehand, using the predicted azimuth and elevation angles.

*General description*

An overall view of the programmer is shown in FIGURE 1. The azimuth and elevation circles which can be seen are Bakelite rings 9 inches inside diameter and ½" thick. In these rings holes are drilled every two degrees over the required range of operation; i.e., from zero to 360° on the azimuth ring and from zero to 90° on the elevation ring. The holes are of such size that ³⁄₃₂" diameter steel pins can be easily inserted and removed. At the expense of larger circles and smaller pins (¹⁄₁₆" diameter) the holes may be drilled every degree.

First consider the azimuth ring with its single circle of holes from zero to 360°. From the centre of this circle an arm, driven by a small motor through a slipping clutch, extends out almost to the ring (see FIGURE 3). On the arm, an electro-magnet operates a spring-loaded push-rod which extends from the arm out to the holes. When the electromagnet is not energized the push-rod extends just far enough to engage inserted pins. When the magnet is energized the rod is pulled back and the arm can move past a pin. With the motor driving the arm running continuously, the arm can be made to advance from one pin to the next every minute by pulsing the electromagnet once a minute. Slip-rings are provided for connections to the azimuth arm. This is certainly not essential since the maximum change during a pass is just a little over 180°, but it is convenient not to have to worry about the connecting wires winding around the shaft. In the programming, the motor is switched to either clockwise or counter-clockwise rotation, as determined from the predictions and it remains that way throughout the pass, since the direction of the required azimuth advances do not change during a pass. Thus, by inserting pins in the holes corresponding to the predetermined angles for one minute intervals, and by switching to the required direction of rotation, the arm will follow the azimuth program. Methods whereby the antenna follows the arm will be discussed after consideration of the elevation programmer.

*Elevation programmer*

In elevation, the antenna must move up and then down during a pass, the maximum elevation ever required being 90°. To accommodate this, a double arc of holes is drilled in the elevation circle from zero to 90°; and two push-rods are mounted on the motor-driven arm (see FIGURE 3). By drilling the inner arc of holes deeper than the outer arc, one push-rod can be made to engage only pins inserted in the inner arc, and the other push-rod can ride over these pins and engage only pins inserted in the outer arc. The inner holes can therefore be used to program the upward motion of the antenna, and the outer holes the downward motion. To reverse the motor driving the arm after the maximum elevation has been reached, a special pin with a larger diameter on top is inserted next to the pin for the maximum elevation, on the inner arc. This special pin closes two contacts on the arm, and these in turn, through a self-holding relay, reverse the motor driving the arm.

*Time programmer*

With the system that has been described the minimum rate of change that can be programmed is 2° per minute. For the majority of satellite passes no slower rate is required, but for overhead passes the azimuth may be required to remain unchanged for almost half the pass, which may mean 10 minutes or more. With two degree intervals on the programmer the antenna must move 20° during this time, but the maximum error could be reduced to 10° by starting the antenna 10° short of the required starting angle. Since the error from this cause would occur at the beginning or end of the pass when the satellite is farthest away and near the horizon, a 10° error might not be acceptable if low angle coverage were inportant. To overcome this limitation a Time Programmer was added, and is shown at the top of FIGURE 1. The 1 r.p.m. motor used to obtain the advance pulses is also used to drive this unit, which consists of a simple electric clock with a single hand making one revolution in 30 minutes. This period of time is longer than the reception time for all but very high orbits. Holes are drilled around the clock for every minute and a wiper on the hand makes contact with pins that may be inserted in these holes. When contact is made by the wiper on the hand, the advance pulse for that minute is suppressed to the azimuth arm. A situation of less importance arises for passes in which the maximum angle of elevation is low. Then it is the elevation angle that may be required to remain unchanged for several minutes. For this case, a selector switch is provided on the Time Programmer so that advance pulses to the elevation arm are suppressed rather than to the azimuth arm.

The clock always starts from the +½ minute position so that the first advance pulse occurs only ½ minute after the programmer start. In this way the step function positioning of the antenna straddles the actual motion of the satellite as it moves across the sky.

Antenna following system

Once the azimuth and elevation arms on the programmer have been made to follow the required program, any suitable servo system can be used to position the antenna. However, to accommodate antennas with induction motor drives (e.g., the Minitrack telemetry antennas), a simple on-off system must be used. The most obvious way to do this is with synchro-control transformers, driven by the programmer arms, with the error signals connected to phase-sensitive detectors followed by polarized relays. Such a system preferably should have pointers as well, driven by synchro receivers so that the operator could check that the antenna was indeed following the arms. The system presently used on the programmer combines the pointer and the servo function by a photo-electric system. The synchro receivers are mounted so that their shafts are concentric with the azimuth and elevation arms. On each of the shafts there is mounted a light-weight disc of sheet film stock, with a pattern on it as shown in FIGURE 1. Two small lights are mounted on each arm under the outer rings of the disc. Photo-diodes above the lights operate relays which in turn operate the antenna drive motors in the direction which brings the opaque wedge on the disc towards the lights and photo-diodes. When the light is cut off from both the photo-diodes, the driving voltage is removed from the antenna drive-motor, and the antenna coasts to a stop. The opaque wedge is made twice as wide as the coasting angle of the motors so that the antenna stops with the wedge centered with respect to the lights and photo-diodes. Nevertheless, it is advisable to keep the coasting angle as small as possible if the antenna is to respond to small changes.

Programming

To set-up the programmer it is necessary to know the azimuth and elevation angles to the satellite at one minute intervals. For Minitrack stations this information is computed at a computation centre, and relayed by teletype to the station concerned. For stations not so supplied, the "look" angles can be computed from charts and graphs, if the principal parameters of the orbit are known.

The method commonly used for stations tracking weather satellites is described in the APT Users' Guide (1) and is quite straightforward for orbits which can be considered circular. This method employs an azimuth-equidistant projection map of the earth with either the north or south geographic pole at the centre. Pivoted at this center is a transparent overlay, on which the ground track of the satellite is drawn. One minute time intervals are marked on the track referenced to the equator crossing, and by turning the overlay so that the track crosses the equator at the required longitude, the sub-satellite point for each minute after equator crossing can be found. With the aid of a tracking diagram centred at the latitude and longitude of the station concerned, the azimuth and great circle arc length to the sub-satellite points are tabulated. Knowing the satellite height, the elevation angles can be determined from the great circle arc lengths. Rather than go through this procedure for every pass, tables can be made up for a series of equator crossings in the regions which bring the satellite within range.

To program for azimuth from the table of "look" angles, pins are inserted in time sequence in the indicated holes. During this procedure it becomes obvious to the programmer whether the azimuth changes clockwise or counter-clockwise during the pass, and the azimuth direction switch is thrown accordingly. The azimuth arm is then moved by hand against the first pin. If in this procedure it is noted that no change is required in the next minute, the pin is placed in that minute on the Time Programmer, and the selector switch is turned to "Azimuth Program." Thus, for each minute of the pass, an azimuth pin must be inserted either in the azimuth circle or in the clock circle.

To program for elevation from the table, pins are again inserted in the indicated holes, the inner arc of holes being used for the upward motion. When the maximum angle has been reached, the reversing pin is inserted next to the maximum elevation pin; the pins for the downward motion are then inserted in the outer arc of holes. If the Time Programmer has not been used in the azimuth program, it can be used to prevent an advance in elevation by inserting a pin in the hole for the appropriate minute and switching to "Elevation Program." Finally, the start button is pushed at the time indicated for zero elevation of the satellite.

I claim:

1. Position control apparatus for controlling a motor driven element to move in a predetermined manner comprising a disc having a plurality of pin-receiving holes therein, a plurality of pins for insertion in said holes in a pattern determined in accordance with said predetermined manner, a rotatable arm pivotally mounted at the centre of said disc, drive means comprising a motor and slip-clutch arrangement capable of rotating said arm, releasable sensing means mounted on said arm to sense and engage with said pins in succession, means capable of releasing said sensing means to permit movement of said arm between pins, and control means to cause movement of said element in accordance with the position of said arm.

2. Apparatus according to claim 1 wherein said control means comprises at least one photo diode, at least one light bulb mounted on said arm whereby movement of said arm causes relative movement between said light bulb and said photo-diode, a rotatable photo disc located between said light bulb and photo-diode, said photo disc having a transparent portion and an associated opaque portion normally interrupting between the light bulb and photo diode, movement of said arm being effective to cause light from said bulb to be incident on the transparent portion of said disc to energize said photo diode to provide an output signal, said output signal causing movement of said element.

3. Apparatus according to claim 2 wherein a synchro-motor and synchro-generator servo-system is provided, wherein the shaft of the synchro-generator is driven by the motor driving said motor driven element to provide a servo output proportional to any movement of said element, the synchro-motor being arranged to rotate said photo disc in response to said servo output in such a direction that said opaque portion moves to interrupt light passing between said light bulb and said photo diode.

4. Position control apparatus for controlling a motor-driven element to move in a predetermined manner comprising a disc having a plurality of pin-receiving holes therein, a plurality of pins for insertion in said holes in a pattern determined in accordance with said predetermined manner, a rotatable arm pivotally mounted at the centre of said disc, drive means capable of rotating said arm, a push rod mounted on said arm and extending radially beyond the end of said arm to sense and engage with said pins in succession, electromagnet disengaging means capable of retracting said push rod radially to permit movement of said arm between pins and control means to cause movement of said element in accordance with the position of said arm.

5. Apparatus as claimed in claim 4 wherein said electromagnet disengaging means is energized by the application thereto of an electrical pulse from a pulse generator whereby said electromagnet is energized for the duration of the pulse only.

6. Apparatus as claimed in claim 5 wherein said pulse generator is controlled by a one r.p.m. motor which also drives an electric clock.

7. Apparatus as claimed in claim 6 wherein said clock has a circular face provided with a circumferential array of equally spaced holes, a plurality of pins capable of being inserted in said holes, a rotatable arm pivotally mounted at the centre of said face, and a wiper fastened to one end of said arm to make contact with pins in said holes, contact of said wiper with a pin being effective to suppress the next electrical pulse from said pulse generator.

8. A method of controlling the position of a motor driven element comprising the steps of storing control information on a disc by inserting pins in holes provided thereon, said pins being positioned to form a predetermined pattern, sensing the position of one of said pins by moving an arm to said position and causing a movement to said motor driven element relative to the displacement of said arm, periodically displacing said arm from one pin to the following pin and automatically monitoring the position of said motor driven element and comparing with said arm.

References Cited
UNITED STATES PATENTS 2,637,835   5/1953   Davidson ___________ 318—433

OTHER REFERENCES

Wray, The Goonhilly Aerial Control System, in Industrial Electronics, vol. 1, No. 5, February 1963, pp. 278–282 relied on.

RODNEY D. BENNETT, *Primary Examiner.*

D. C. KAUFMAN, *Assistant Examiner.*